United States Patent [19]
Pietsch et al.

[11] Patent Number: 5,411,273
[45] Date of Patent: May 2, 1995

[54] LIP SEAL TO SEAL A SHAFT, IN PARTICULAR A SHIP'S PROPELLER SHAFT

[75] Inventors: Günter Pietsch, Hamburg; Ernst-Peter von Bergen, Ahlefeld, both of Germany

[73] Assignee: Blohm + Voss AG, Hamburg, Germany

[21] Appl. No.: 994,589

[22] Filed: Dec. 18, 1992

[30] Foreign Application Priority Data

Dec. 19, 1991 [DE] Germany ............................ 4141999

[51] Int. Cl.⁶ .............................................. F16J 15/32
[52] U.S. Cl. .......................................... 277/1; 277/27; 277/152
[58] Field of Search ................... 277/1, 152, 27, 153, 277/28, 47, 58

[56] References Cited

U.S. PATENT DOCUMENTS

| | | | |
|---|---|---|---|
| 3,210,086 | 10/1965 | Hudson et al. | 277/153 |
| 3,413,008 | 11/1968 | Greiner | 277/153 |
| 4,195,854 | 4/1980 | Bertin | 277/153 |
| 4,344,631 | 8/1982 | Winn | 277/153 |
| 4,395,141 | 7/1983 | Pietsch et al. | 384/147 |
| 4,448,425 | 5/1984 | von Bergen | 277/34 |
| 5,137,116 | 8/1992 | von Bergen et al. | 184/6.22 |

FOREIGN PATENT DOCUMENTS

| | | |
|---|---|---|
| 2064542 | 7/1972 | Germany . |
| 3718411 | 12/1988 | Germany . |
| 3742080 | 6/1989 | Germany . |
| 3817660 | 12/1989 | Germany . |
| 3924270 | 1/1991 | Germany . |
| 2154868 | 6/1990 | Japan ................. 277/152 |
| 0873384 | 7/1961 | United Kingdom ......... 277/152 |
| 2101237 | 1/1983 | United Kingdom . |
| 2213540 | 8/1989 | United Kingdom . |

Primary Examiner—Daniel G. DePumpo
Attorney, Agent, or Firm—Nils H. Ljungman & Associates

[57] ABSTRACT

This invention relates to lip seals for shafts, whose lip bodies consist of rubber elastic material, and is mounted on the reverse side on an essentially radial surface of a back-up ring which is integral with the housing. When the pressure of the medium to be sealed out increases, dangerous overloads occur on the lip edge, in spite of the roller diaphragm-like deformation of the lip body. According to the invention, these overloads are reduced by the introduction of a trough in the supporting back-up ring in the zone of the lip body near the clamp, into which the lip body is deformed and thus the pressure on the edge of the lip is reduced (FIG. 1).

13 Claims, 4 Drawing Sheets

LIP SEAL TO SEAL A SHAFT, IN PARTICULAR A SHIP'S PROPELLER SHAFT

BACKGROUND OF THE INVENTION

1. Field of the Invention

This invention relates to a lip seal for sealing around a shaft, in particular for sealing a ship's propeller shaft in relation to a fluid medium. Such a seal generally can have a clamping part which can be clamped between a first and second back-up ring integral with the shaft housing, a seal lip for sealing against the shaft, and an intermediate part therebetween. The intermediate part can have two zones, the first zone of which is adjacent to the clamping part and the second zone of which supports the seal lip, whereby the two zones form a folded, elastic joint and are disposed angularly with respect to one another. When the pressure of the medium to be sealed out increases beyond a normal pressure, the angle joint of the intermediate part is deformed toward the shaft and into contact with the second back-up ring.

2. Background Information

Lip seals of this type are disclosed by German Laid Open Patent Appln. Nos. 37 18 411, 37 42 080, 38 17 660 and 39 24 270. In such lip seals, when the pressure of the medium to be sealed out increases, the angle joint is deformed towards the shaft in the manner of a roller diaphragm. Such a deformation results in a reduction of the effective surface area of the second zone of the intermediate part, pressurized by the medium to be sealed out, in the direction of the application force of the seal lip edge. Thus the application force is reduced.

This desirable effect is compromised, or reduced, however, by the fact that the second zone of the intermediate part is shortened, whereby the portion of the contact force caused by the elastic righting moment of the intermediate portion is increased. On account of this force acting in the opposite direction, the above-mentioned depressurization effect is reduced, so that at high pressures of the medium to be sealed out, overheating can occur at the lip edge. Such an overheating can cause leaks or even the complete failure of the seal.

German Laid Open Patent Appln. No. 20 64 542 discloses a lip seal on which a back-up ring integral with the housing has a trough which, at normal pressure of the medium to be sealed out, forms a sickle-shaped gap with the sealing body, and when the pressure of the medium to be sealed out increases, this space is filled by the sealing body. However, the trough of the back-up ring is not located between the fastening point of the sealing body and the angle joint, but between the angle joint and the free, or exposed end of the back-up ring, which backup ring runs approximately parallel to the second zone of the intermediate part. In this configuration, accordingly, the seal lip does not retain its unrestricted ability to follow the oscillations of the shaft.

OBJECT OF THE INVENTION

The object of the invention is to overcome these problems in a simple manner without the use of any support components in the lip body, or without the use of two materials with different elasticity characteristics etc., and thus to create a lip seal in which the contact force of the lip seal is not proportional to the pressure of the medium being sealed out, but rather increases degressively in relation to the pressure.

SUMMARY OF THE INVENTION

This object is achieved by a seal assembly in which the second back-up ring is configured with a trough preferably at the level of the first zone of the intermediate part. This trough is preferably sized so that under conditions of a normal pressure applied to the seal by the medium to be sealed out, there is a sickle-shaped gap between the back-up ring and the first zone of the intermediate part. On the other hand, however, when the pressure of the medium to be sealed out increases, the trough and seal are configured such that the gap is filled by the first zone of the intermediate part of the seal.

The spreading of the first zone of the intermediate part into the trough and its related deformation thereby causes an enlargement of the angle at the angle joint of the intermediate portion, and thus a reduction of the righting moment, which acts in the direction of a depressurization of the lip edge, and thus makes possible the desired degressive characteristic, An essential advantage of the solution according to the present invention is also based on the fact that with a lip seal having a clamping part, an intermediate part, and a seal lip as discussed above, the inherent ability of the seal to freely follow the unavoidable oscillating movements of the shaft in the radial direction is completely retained.

As discussed previously, location of the trough between the angle joint and the free end of the back-up ring which runs approximately parallel to the second part of the intermediate part as disclosed by German Laid Open Patent Appln. No. 20 64 542, results in a seal which does not retain its unrestricted ability to follow the oscillations of the shaft. As per the present invention, however, location of the trough between the fastening point of the sealing body and the angle joint, does allow for the seal to follow the unavoidable radial oscillations of the shaft.

Additional advantageous embodiments of the present invention are summarized herebelow.

In the area of the second zone of the intermediate part of the lip seal according to the present invention there can also be, on the reverse side, or side away from the side onto which the pressure is applied, a flat surface piece. This flat surface piece, at normal pressure of the medium to be sealed out, preferably forms a wedge gap with the contact surface of the second back-up ring, whereby the wedge angle of the wedge gap is sized so that at high pressure of the medium to be sealed out, the wedge gap is up to approximately 90% closed.

Thus, there is a second advanced angle joint, which limits the roller diaphragm-like deformation of the lip body, so that when there is a specified maximum pressure of the medium to be sealed out, no further deformation can take place. Such a configuration can be desirable under certain conditions.

Further, on the side of the lip seal opposite to the side to which the pressure is applied, there can generally be a space between the angle joint of the intermediate part and the shaft about which the seal is disposed. This space can preferably be connected to the sickle-shaped gap by means of connection passages formed by elevations and/or depressions in the vicinity of the angle joint on the intermediate part, and/or on the second back-up ring. These connection passages can allow fluid flow to occur between the space and the sickle-shaped gap to thereby allow fluid to flow into and out of the sickle-shaped gap as the first moves towards and away from the second back-up ring.

Thus, in the event that the elastic return of the lip body, after the decrease in pressure of the medium to be sealed out, is insufficient to overcome the adhesion forces at the contact surface, such as a vacuum which might occur in this area, the release is essentially guaranteed by the creation of the communication passages to the space facing away from the pressure. In general, in this space, atmospheric pressure or a relatively low overpressure typically prevails.

One aspect of the invention resides broadly in apparatus for sealing about a propeller shaft of a ship, the apparatus comprising: a seal housing; the seal housing comprising a first annular portion and a second annular portion, each of the first annular portion and the second annular portion being disposed about the propeller shaft; a lip seal being fixedly held between the first annular portion of the seal housing and the second annular portion of the seal housing; the second annular portion comprising a recessed portion disposed adjacent the lip seal; the lip seal being configured for sealing out an outside medium; the lip seal comprising: an upper portion, an intermediate portion and a lower portion; the upper portion being fixedly held between a portion of the first annular portion of the seal housing and a portion of the second annular portion of the seal housing; the lower portion being disposed directly about the propeller shaft and being configured for sealing about the propeller shaft; the intermediate portion extending between the upper portion and the lower portion; the intermediate portion of the lip seal being configured for, in response to a change in the pressure of the outside medium: being displaced into the recessed portion of the annular portion; and relieving pressure from the lower portion of the lip seal.

Another aspect of the invention resides broadly in a method of sealing about a propeller shaft of a ship, the method comprising the steps of: providing a seal housing; providing the seal housing with a first annular portion and a second annular portion; disposing each of the first annular portion and the second annular portion about the propeller shaft; providing a lip seal and disposing the lip seal about the propeller shaft; fixedly holding the lip seal between the first annular portion of the seal housing and the second annular portion of the seal housing; providing the second annular portion with a recessed portion adjacent the lip seal; configuring the lip seal for sealing out an outside medium; configuring the lip seal to include an upper portion, an intermediate portion and a lower portion; fixedly holding the upper portion between a portion of the first annular portion of the seal housing and a portion of the second annular portion of the seal housing; disposing the lower portion directly about the propeller shaft and being configured for sealing about the propeller shaft; configuring the intermediate portion to extend between the upper portion and the lower portion; configuring the intermediate portion of the lip seal for, in response to a change in the pressure of the outside medium: being displaced into the recessed portion of the annular portion; and relieving pressure from the lower portion of the lip seal; in response to a change in the pressure of the outside medium: displacing the intermediate portion into the recessed portion of the second annular portion; and relieving pressure from the lower portion of the lip seal.

BRIEF DESCRIPTION OF THE DRAWINGS

The object of the invention is illustrated schematically with reference to two embodiments as depicted in the accompanying drawings, in which.

DESCRIPTION OF THE PREFERRED EMBODIMENTS

The identical parts are identified by the same identification numbers in all the figures.

Figure 1:
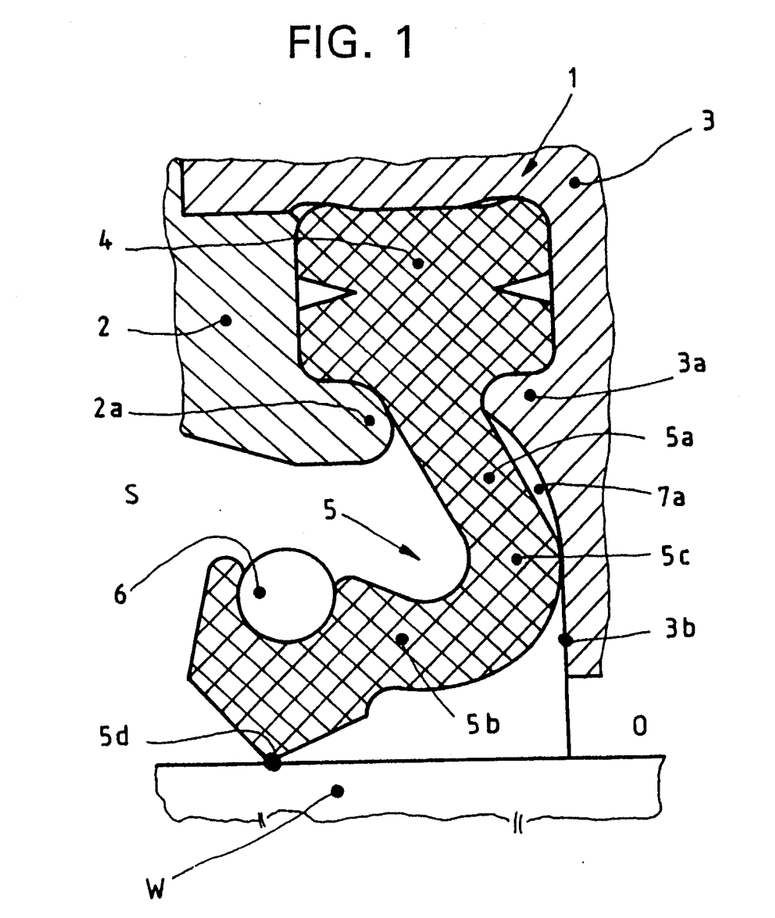
FIG. 1 shows a lip body with a rounded angle joint while under normal pressure of the medium to be sealed out.
Figure 1A:
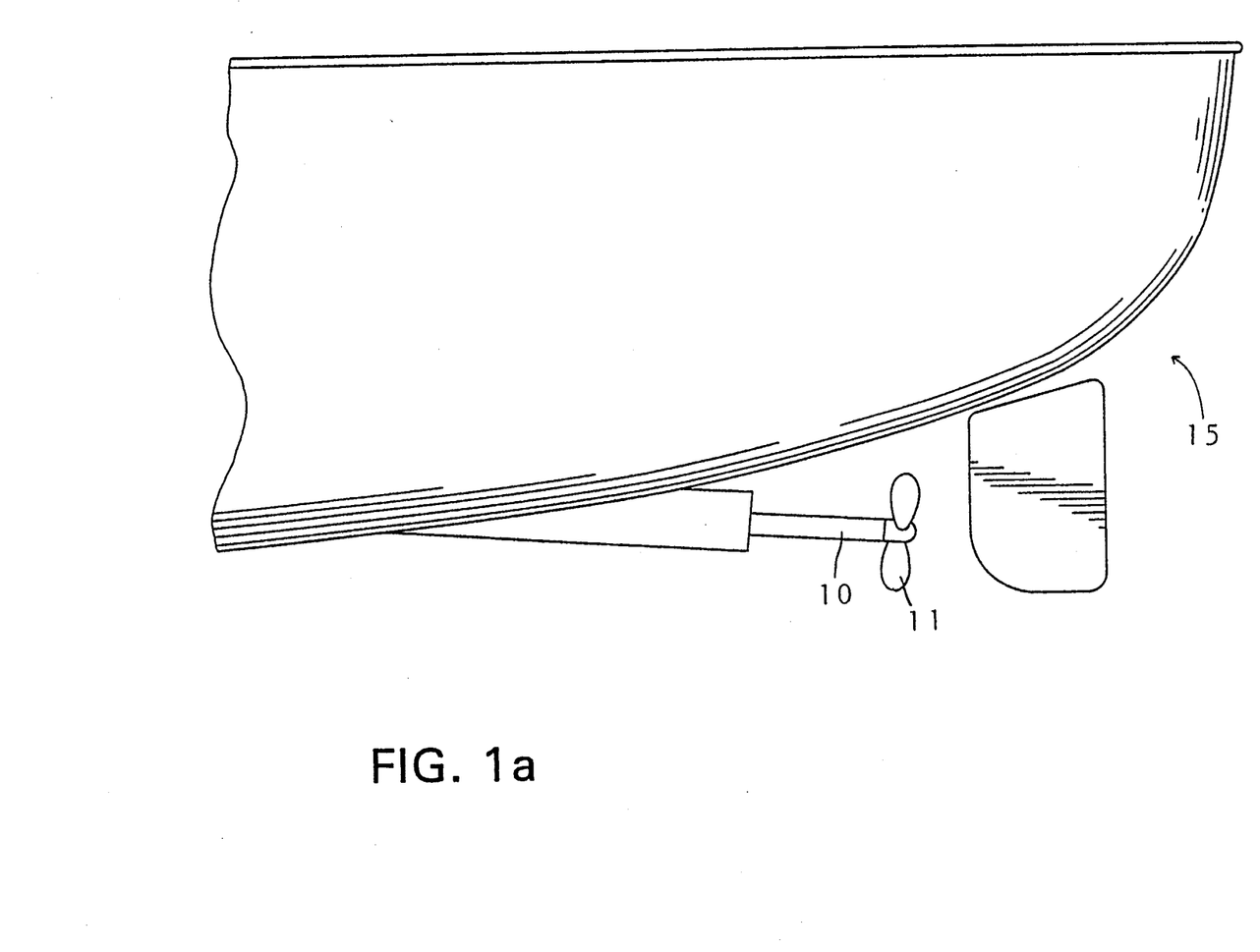
FIG. 1a shows a ship which could utilize the sealing arrangement of the present invention.

FIG. 1a generally indicates a ship 15 having a propeller 11, which propeller is disposed on a shaft 10 running from an interior of the ship to the exterior of the ship. Thus, since the exterior of the ship in the vicinity of the propeller 11 is usually disposed in water, some sort of seal arrangement is generally needed about the propeller shaft 10 to seal the water out of the ship and also possibly seal any lubricating oils, etc., inside the body of the ship.

Figure 1B:
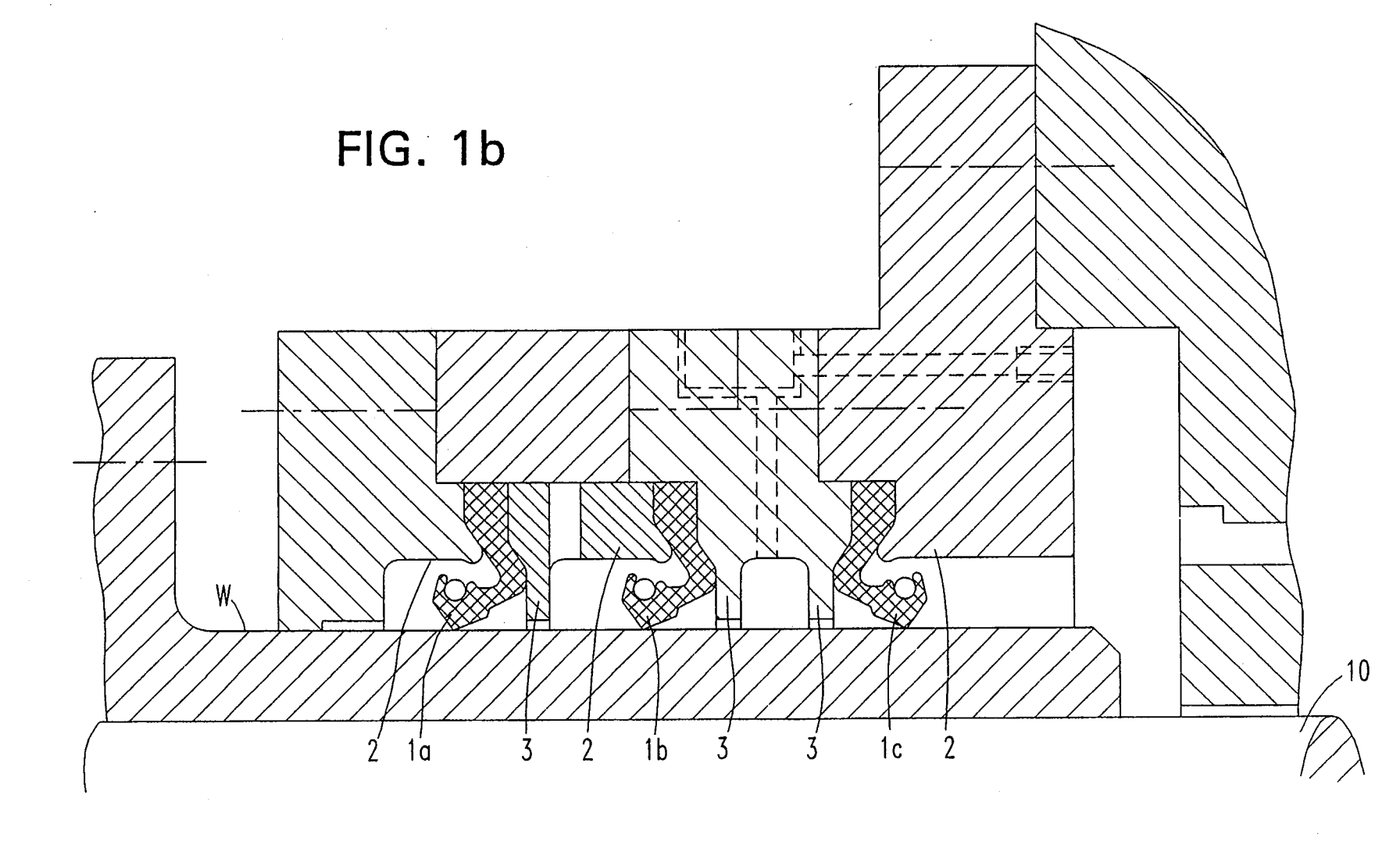
FIG. 1b shows an arrangement of lip seals about a propeller shaft of a ship.

As shown in FIG. 1b, an annular seal assembly for a propeller shaft 10 having a shaft surface W preferably has at least one lip seal body 1a, 1b and/or 1c disposed between two retaining, or back-up rings 2 and 3. On a propeller shaft of a ship, it may be desirable to have a series of such seal assemblies, or there could possibly be only one such assembly. In general, seal bodies, such as seal bodies 1a and 1b, can preferably be disposed towards an outside of the ship to seal out water, while at least one seal body, such as seal body 1c can be disposed towards an inside of the ship to seal in a lubricating oil, for example.

Such lip seals are illustrated in more detail in FIGS. 1 to 4. The lip seals are preferably composed of a lip body 1, which preferably is a rubber-elastic material, and two back-up rings 2 and 3, which can preferably be made of metal, or another rigid material. The back-up rings 2 and 3 can preferably be supported so that they cannot rotate in a housing (not shown) in this case in the stern tube of a ship. In such an arrangement, the lip body 1, with its clamping part 4, can preferably be clamped in a fluid-tight manner between the two back-up rings 2, 3 by means of clamping means which are not shown but would be known in the art to someone of ordinary skill in the art.

Contiguous to the clamping part 4 of the lip body 1 is preferably an intermediate part 5. As shown in the drawings, this intermediate part 5 can have several parts: a first zone 5a running at an angle to the radial direction of the shaft; a zone 5b running approximately axially with the shaft and bent in relation to the first zone 5a; a connection part 5c connecting the first zone 5a with the zone 5b; and a seal lip 5d. The connection part 5c generally forms a rounded angle joint between zones 5a and 5c, while the zone 5b preferably supports the seal lip 5d, which seal lip 5d is generally in contact with the surface W of the shaft.

The angle of the rounded angle joint 5c, between zones 5a and 5b, opens toward the medium S to be sealed and can be in a range of from approximately 50 to approximately 70 degrees. The application force of the seal lip 5d against the shaft W is applied on one hand by the elastic righting moment of the angled lip body 1, and on the other hand by a coil spring 6 inserted in an annular groove of the second zone 5b of the intermediate part 5.

Such an elastic righting moment could further be described as a resilient force acting to bring the seal body 1 into what could be termed an unstressed or natural configuration. This natural configuration would be a configuration of the seal body before the seal body was disposed about the shaft, or before the seal body 1 was stressed into the position as shown in FIGS. 1–4, a position in which the angle of joint 5c could be greater than about 70 degrees. Thus, there is a natural, or resilient tendency of the seal body to maintain the seal lip 5d against the shaft.

The two back-up rings 2, 3 are each preferably equipped with bead-like projections 2a, 3a. These projections 2a and 3a preferably overlap, or cover over, portions of the clamping part 4 of the seal body 1. In this manner, the seal body 1 can be maintained in position between the two back-up rings 2 and 3. These two projections 2a and 3a essentially form a ring-shaped gap about the shaft, through which ring-shaped gap the intermediate part 5 of the seal body 1 can project.

While the back-up ring 2, facing the medium S to be sealed out, ends with its projection 2a, the back-up ring 3, on the other side of the seal body 1 away from the medium to be sealed out, can preferably be extended. Initially, this extension can preferably be approximately parallel to the angled first zone 5a of the intermediate part 5, and thence, can extend approximately radially until it reaches the vicinity of the shaft surface.

The above-mentioned sloping segment of the back-up ring 3 is preferably curved in such a manner that a trough 7 can be said to be formed in the surface of the back-up ring facing the seal body 1. Thus, under a normal pressure of the medium to be sealed out, a sickle-shaped annular gap 7a is formed between the neighboring zone 5a of the intermediate part 5 and the surface of the back-up ring 3. The depth of the trough 7 can be configured so that under an increased pressure of the medium to be sealed out, the zone 5a can deform into the gap 7a until a pressure is reached wherein the sickle-shaped gap 7a is essentially completely filled by the deformed zone 5a of the intermediate part 5, as shown in FIGS. 2 and 4.

Figure 2:
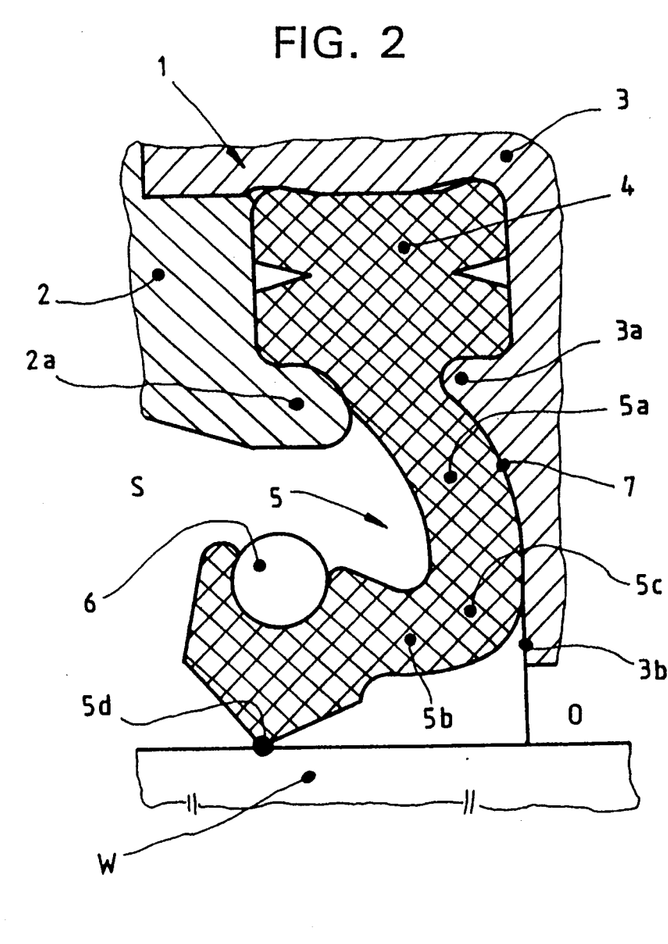
FIG. 2 shows the same lip body illustrated in FIG. 1 at under high pressure of the medium to be sealed out.
Figure 3:
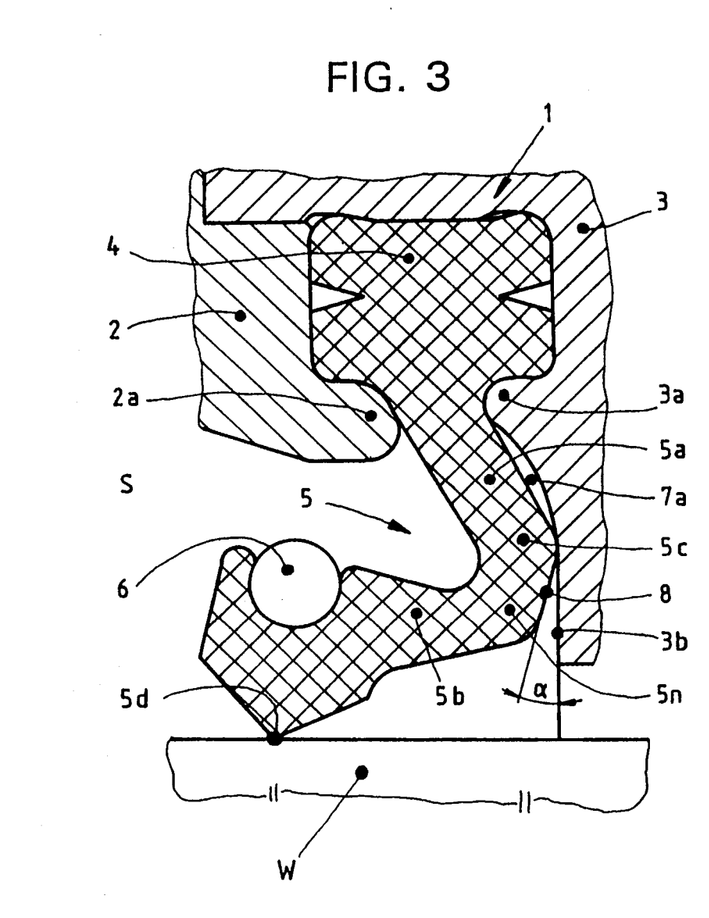
FIG. 3 shows a lip body with two angle joints and a sloping surface under normal pressure of the medium to be sealed out.
Figure 4:
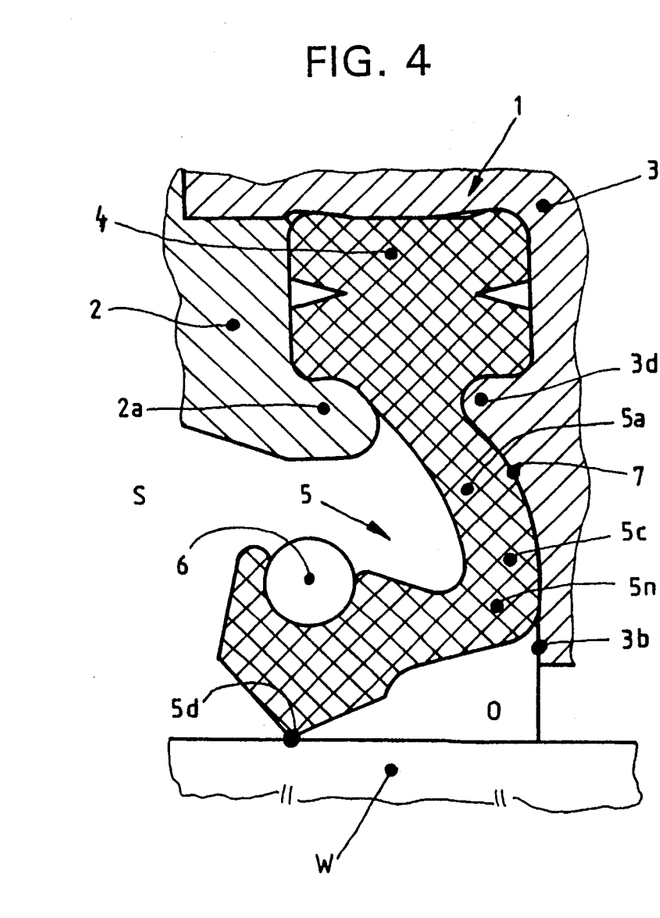
FIG. 4 shows the same lip body illustrated in FIG. 3 under high pressure of the medium to be sealed out.

Simultaneously along with this deformation of the zone 5a, there is generally also a roller diaphragm-like deformation of the angle joint 5c toward the shaft, whereby, as shown in FIG. 2, there is a sort of rolling of the angle joint 5c along the plane surface 3b, while as shown in FIG. 4, there is a essentially a pivoting forward of the sloped portion 8 on the surface 3b of the back-up ring 3. As illustrated in FIG. 3, this sloped portion 8 is disposed at the second zone 5b of the intermediate part 5.

The latter configuration having the sloped portion 8, on account of the formation of a second advanced angle joint 5n, makes it possible to limit the rolling motion of the seal body 1 when a specified limit pressure of the medium to be sealed out has been reached. In other words, once the angle alpha between the back-up ring 3 and the surface 8 has been essentially closed, generally no further rolling motion of the seal body on the back-up ring 3 will occur. On the other hand, with the embodiment of FIGS. 1 and 2, without the sloped portion 8, an additional increase in pressure could possibly cause further rolling of the seal body 5 along the surface of the back-up ring 3. This wedge angle alpha can be configured in a manner such that the wedge gap is approximately 90% closed under a high pressure. As shown in FIG. 3, under normal pressure, this wedge angle can be about 16 degrees, and depending on the desired use of the seals, could extend a number of degrees greater than 16 degrees, or a number of degrees less than 16 degrees.

As shown in FIGS. 1–4, when the lip seals are configured as discussed above, there is also generally a space O bordered by the seal body 1, the shaft W and the back-up ring 3. This space O, which can possibly be unpressurized, or at atmospheric pressure, is essentially separated from the sickle-shaped gap 7a by the seal body 1 in the vicinity of the angle portion 5c. Thus, in order to allow essentially unrestricted movement of the zone 5a into and out of the gap 7a, at least one of: the seal body 1, and the back-up ring 3, can preferably have, in the vicinity of the angle joint 5c, elevations and/or depressions thereon. These elevations and/or depressions can thus preferably provide at least one communication passage between the sickle-shaped gap 7a and the space O. Thus, the fluid in gap 7a can essentially be easily displaced out of the gap 7a upon deformation of the zone 5a into the gap 7a, and the displaced fluid can thereby also be easily replenished upon movement of the zone 5a back to its original, or undeformed position. In this manner, any adhesion forces tending to retain the deformed zone 5a in the gap 7a, such as a vacuum which could possibly form in the gap 7a, can be overcome.

Such a seal assembly as disclosed above according to the present invention can then be used to provide a seal about the propeller, which seal efficiently seals out water while still being capable of following the unrestricted radial oscillations of the shaft. In general, a method of using the seal assembly according to the present invention could be stated as follows:

A lip seal body 1, in a natural, unstressed configuration, can be inserted onto a propeller shaft and clamped into position between the back-up rings 2 and 3. Upon insertion of the lip seal body onto the shaft, the body 1 would generally assume a configuration as generally shown in FIGS. 1 and 3, which configuration could be said to be stressed in a manner such that the seal lip 5d is forced towards the shaft to thereby provide an efficient seal about the shaft. The propeller shaft, seal assembly could then be inserted into water, under which conditions there would be a normal or standard pressure applied on the lip seal body 1 by the surrounding water.

Under such normal pressure, the zone 5a would essentially be spaced apart from the back-up ring 3 to form a sickle-shaped zone 7a. If operating conditions were to occur in which there would be an increase in pressure on the lip seal body 1 by the surrounding water, the zone 5a would generally then be displaced into the gap 7a and the angle joint 5c would roll along the back-up ring 3c towards the shaft. Thus, in general, the increased pressure would have a tendency to force the seal lip 5d even tighter against the shaft, causing an increase in friction and an overheating of the lip seal 5d. However, because of the above-discussed deformation of the zone 5a and the angle joint 5c, the above-discussed righting moment would be decreased, thereby relieving some of the sealing pressure of the seal lip 5d against the shaft, and overheating of the seal lip 5d would be prevented.

One feature of the invention resides broadly in the lip seal to seal a shaft, in particular a ship's propeller shaft, in relation to a fluid medium, consisting of an clamping part which can be clamped between a first and second back-up ring integral with the housing, an intermediate part with two zones, the first zone of which is adjacent to the clamping part and the second zone of which supports the seal lip, whereby the two zones form a folding angle joint with one another, whereby moreover the first zone is in contact with the second back-up ring and whereby the second back-up ring has a contact surface running essentially radially for the angle joint of the intermediate part which is deformed toward the shaft when the pressure of the medium to be sealed out increases, characterized by the fact that the second back-up ring 3 at the level of the first zone 5a of the intermediate part 5 has a trough 7, which is sized so that at normal pressure of the medium S to be sealed out, there is a sickle-shaped gap 7a left open, while when the pressure of the medium S to be sealed out increases, the gap 7a is filled by the first zone 5a of the intermediate part 5.

Another feature of the invention resides broadly in the lip seal, characterized by the fact that the second zone 5b of the intermediate part 5 is equipped on the reverse side facing away from the angle joint 5c with a flat surface piece 8, which at normal pressure of the medium S to be sealed out forms a wedge gap with the contact surface 3b of the second back-up ring 3, whereby the wedge angle of the wedge gap is sized so that at high pressure of the medium S to be sealed out, the wedge gap is up to approximately 90% closed.

Still another feature of the invention resides broadly in the lip seal, characterized by the fact that in the vicinity of the angle joint 5c on the intermediate part 5 and/or on the second back-up ring 3, there are elevations and/or depressions which form a connection between the sickle-shaped gap 7a and the space O of the lip seal facing away from the pressure.

Examples of sealing arrangements, having components which may be utilized in accordance with the embodiments of the present invention, may be found in the following von Bergen et al. U.S. Pat. No. 5,137,116, which issued on Aug. 11, 1992; von Bergen U.S. Pat. No. 4,448,425, which issued on May 15, 1984; and Pietsch et al. U.S. Pat. No. 4,395,141, which issued on Jul. 26, 1983.

All, or substantially all, of the components and methods of the various embodiments may be used in any combination with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. Apparatus for sealing about a propeller shaft of a ship, said apparatus comprising:
   a seal housing;
   said seal housing comprising a first annular portion and a second annular portion, each of said first annular portion and said second annular portion being disposed about the propeller shaft;
   a lip seal being fixedly held between said first annular portion of said seal housing and said second annular portion of said seal housing;
   said second annular portion comprising a recessed portion disposed adjacent said lip seal;
   said lip seal being configured for sealing out an outside medium;
   said lip seal comprising:
      an upper portion, an intermediate portion and a lower portion;
      said upper portion being fixedly held between a portion of said first annular portion of said seal housing and a portion of said second annular portion of said seal housing;
      said lower portion for being disposed directly about the propeller shaft and being configured for sealing about the propeller shaft;
      said intermediate portion extending between said upper portion and said lower portion;
   said intermediate portion of said lip seal being configured for, in response to a change in the pressure of the outside medium:
      being displaced into said recessed portion of said second annular portion; and
      relieving pressure from said lower portion of said lip seal;
   said intermediate portion of said lip seal comprising:
      a first zone disposed adjacent said upper portion;
      a second zone disposed adjacent said lower portion;
      said second zone being configured for supporting said lower portion;
      an angled zone connecting said first zone and said second zone;
      said angled zone being configured to define an acute angle between said first zone of said intermediate portion and said second zone of said intermediate portion;
   said second annular portion comprising a first portion adjacent said first zone of said intermediate portion of said lip seal;
   said recessed portion of said second annular portion of said seal housing being configured such that:
      at a normal pressure of the outside medium, a gap exists between said first zone of said intermediate portion of said lip seal and said first portion of said second annular portion; and
      when the pressure of the outside medium is higher than the normal pressure, said first zone of said intermediate portion of said lip seal fills said gap;
   said recessed portion of said second annular portion comprising a curved surface, said curved surface being concave with respect to said lip seal; and
   said gap, when the outside medium is at normal pressure, is bounded by:
      said intermediate portion of said lip seal; and said curved surface of said recessed portion of said second annular portion.

2. The apparatus according to claim 1, wherein:
said lower portion comprises a seal lip for being disposed directly adjacent the propeller shaft of the ship and being configured for sealing about the propeller shaft;
said lip seal is configured such that, upon an increase in the pressure of the outside medium:
said angle between said first zone and second zones of said intermediate portion is increased; and
pressure is relieved from said seal lip.

3. The apparatus according to claim 2, wherein:
said first zone of said intermediate portion of said lip seal comprises a flat planar surface portion when the outside medium is at normal pressure;
said gap, when the outside medium is at normal pressure, is bounded by:
said flat planar surface portion of said first zone of said intermediate portion of said lip seal; and
said curved surface of said recessed portion of said second annular portion.

4. The apparatus according to claim 3, wherein:
said angled zone of said intermediate portion comprises a first side for facing towards the outside medium, and a second side for facing away from the outside medium;
said second annular portion comprising a second portion adjacent said angled zone of said intermediate portion of said lip seal;
said second portion of said second annular portion comprising a contact surface for being oriented in a radial direction of the propeller shaft;
said second side of said angled zone of said intermediate portion of said lip seal comprising a flat planar portion;
said flat planar portion of said second side of said angled zone being configured to form, when the outside medium is at normal pressure, a wedge-shaped gap in conjunction with said contact surface of said second portion of said second annular portion; and
said lip seal being configured such that, when the pressure of the outside medium is at a pressure higher than the normal pressure, said flat planar portion of said second side of said angled zone of said intermediate portion of said lip seal is displaced towards said contact surface of said second annular portion to substantially close said wedge-shaped gap.

5. The apparatus according to claim 4, wherein a space, for being filled with fluid, is defined between the propeller shaft, said second annular portion, and said lip seal, on a side of said lip seal opposite from the outside medium, said apparatus further comprising:
said first portion of said second annular portion comprising said recessed portion;
said wedge-shaped gap defining an angle of about 16 degrees when the outside medium is in said rest position;
said lip seal for being in a rest position when the outside medium is at normal pressure and for being in a deformed position when the pressure of the outside medium is higher than normal pressure;
said lip seal being configured to follow oscillating movements of the shaft both when said first zone of said intermediate portion is in said rest position and when said first zone of said intermediate portion is in said deformed position;
said angled zone of said lip seal being in contact with said second annular portion of said seal housing at a contact point when said lip seal is in said rest position;
said recessed portion of said second annular portion being disposed between said upper portion of said lip seal and said point where said angled zone of said lip seal contacts said second annular portion;
said angle between said first zone and said second zone of said intermediate portion being an acute angle both when said lip seal is in said rest position and when said lip seal is in said deformed position;
said lip seal comprising a rubber-elastic material;
each of said first and second annular portions being a back-up ring;
each of said first and second annular portions comprising a rigid material;
each of said first and second annular portions for being non-rotatably disposed about the propeller shaft;
said first zone of said intermediate portion for being oriented at an angle with respect to a radial direction of the propeller shaft when said lip seal is in said rest position;
said angle zone comprising a generally rounded connection between said first zone of said intermediate portion and said second zone of said intermediate portion;
said seal lip being configured for being in direct contact with the propeller shaft;
said angle between said first zone and said second zone, defined by said angled zone, for being open towards the outside medium;
said angle between said first zone and said second zone for being between about 50 and about 70 degrees when said lip seal is in said rest position;
said lip seal comprising an annular groove in the vicinity of said second portion of said intermediate portion;
coil spring means being accommodated within said annular groove, said coil spring means being configured for holding said seal lip on the propeller shaft;
said coil spring means having a generally circular cross-section;
each of said first and second annular portions comprising a protrusion;
said protrusion of said first annular portion being disposed opposite said protrusion of said second annular portion, both said protrusions defining a space therebetween;
said first annular portion and said second annular portion forming an annular channel being partially bounded by said protrusions;
said annular channel having a generally rectangular cross-section;
said upper portion of said lip seal being clamped in place, in a fluid-tight manner, in said annular channel formed by said first and second annular portions;
said first zone of said intermediate portion of said lip seal initiating at said space between said protrusions and substantially filling said space between said protrusions;

said recessed portion of said second annular portion initiating adjacent said projection of said second annular portion; and said second portion of said second annular portion for being oriented in a radial direction of the propeller shaft.

6. The apparatus according to claim 3, wherein a space, for being filled with fluid, is defined between the propeller shaft, said second annular portion, and said lip seal, on a side of said lip seal opposite from the outside medium, said apparatus further comprising:

said second annular portion comprising:
- a first portion adjacent said first zone of said intermediate portion of said lip seal; and
- a second portion adjacent said angled zone of said intermediate portion of said lip seal; said second portion of said second annular portion comprising a contact surface for being oriented in a radial direction of the propeller shaft;

said first portion of said second annular portion comprising said recessed portion;

said lip seal for being in a rest position when the outside medium is at normal pressure and for being in a deformed position when the pressure of the outside medium is higher than normal pressure;

said lip seal being configured to follow oscillating movements of the shaft both when said first zone of said intermediate portion is in said rest position and when said first zone of said intermediate portion is in said deformed position;

said angled zone of said lip seal being in contact with said second annular portion of said seal housing at a contact point when said lip seal is in said rest position;

said recessed portion of said second annular portion being disposed between said upper portion of said lip seal and said point where said angled zone of said lip seal contacts said second annular portion;

said angle between said first zone and said second zone of said intermediate portion being an acute angle both when said lip seal is in said rest position and when said lip seal is in said deformed position;

said lip seal comprising a rubber-elastic material;

each of said first and second annular portions being a back-up ring;

each of said first and second annular portions comprising a rigid material;

each of said first and second annular portions for being non-rotatably disposed about the propeller shaft;

said first zone of said intermediate portion being for oriented at an angle with respect to a radial direction of the propeller shaft when said lip seal is in said rest position;

said angle zone comprising a generally rounded connection between said first zone of said intermediate portion and said second zone of said intermediate portion;

said seal lip being configured for being in direct contact with the propeller shaft;

said angle between said first zone and said second zone, defined by said angled zone, for being open towards the outside medium;

said angle between said first zone and said second zone for being between about 50 and about 70 degrees when said lip seal is in said rest position;

said lip seal comprising an annular groove in the vicinity of said second portion of said intermediate portion;

coil spring means being accommodated within said annular groove, said coil spring means being configured for holding said seal lip on the propeller shaft;

said coil spring means having a generally circular cross-section;

each of said first and second annular portions comprising a protrusion;

said protrusion of said first annular portion being disposed opposite said protrusion of said second annular portion, both said protrusions defining a space therebetween;

said first annular portion and said second annular portion forming an annular channel being partially bounded by said protrusions;

said annular channel having a generally rectangular cross-section;

said upper portion of said lip seal being clamped in place, in a fluid-tight manner, in said annular channel formed by said first and second annular portions;

said first zone of said intermediate portion of said lip seal initiating at said space between said protrusions and substantially filling said space between said protrusions;

said recessed portion of said second annular portion initiating adjacent said projection of said second annular portion;

said second portion of said second annular portion for being oriented in a radial direction of the propeller shaft; and said lip seal being configured such that, while said first zone of said intermediate portion displaces into said gap, said angled zone undergoes a roller-like deformation along said second portion of said second annular portion, initiating from said contact point.

7. Method of sealing about a propeller shaft of a ship, said method comprising the steps of:
- providing a seal housing;
- providing the seal housing with a first annular portion and a second annular portion;
- disposing each of the first annular portion and the second annular portion about the propeller shaft;
- providing a lip seal and disposing the lip seal about the propeller shaft;
- fixedly holding the lip seal between the first annular portion of the seal housing and the second annular portion of the seal housing;
- providing the second annular portion with a recessed portion adjacent the lip seal;
- configuring the lip seal for sealing out an outside medium;
- configuring the lip seal to include an upper portion, an intermediate portion and a lower portion;
- fixedly holding the upper portion between a portion of the first annular portion of the seal housing and a portion of the second annular portion of the seal housing;
- disposing the lower portion directly about the propeller shaft and configuring the lower portion for sealing about the propeller shaft;
- configuring the intermediate portion to extend between the upper portion and the lower portion;

configuring the intermediate portion of the lip seal
for, in response to a change in the pressure of the
outside medium:
being displaced into the recessed portion of the
annular portion; and
relieving pressure from the lower portion of the lip
seal; and
performing the following steps in response to a
change in the pressure of the outside medium:
displacing the intermediate portion into the recessed portion of the second annular portion; and
relieving pressure from the lower portion of the lip
seal;
configuring the intermediate portion of the lip seal to
comprise:
a first zone disposed adjacent the upper portion;
a second zone disposed adjacent the lower portion;
the second zone being configured for supporting
the lower portion;
an angled zone connecting the first zone and the
second zone;
the angled zone being configured to define an acute
angle between the first zone of the intermediate
portion and the second zone of the intermediate
portion;
configuring the second annular portion to comprise a
first portion adjacent the first zone of the intermediate portion of the lip seal;
configuring the recessed portion of the second annular portion of the seal housing such that:
at a normal pressure of the outside medium, a gap
exists between the first zone of the intermediate
portion of the lip seal and the first portion of the
second annular portion; and
when the pressure of the outside medium is higher
than the normal pressure, the first zone of the
intermediate portion of the lip seal fills the gap;
configuring the recessed portion of the second annular portion to comprise a curved surface, the
curved surface being concave with respect to the
lip seal;
configuring the lip seal such that the gap, when the
outside medium is at normal pressure, is bounded
by:
the intermediate portion of the lip seal; and
the curved surface of the recessed portion of the
second annular portion;
providing the gap between the first zone of the intermediate portion of the lip seal and the first portion
of the second annular portion, at a normal pressure
of the outside medium, and
filling the gap with the intermediate portion of the lip
seal, when the pressure of the outside medium is
higher than the normal pressure; and
supporting the lower portion of the lip seal by means
of the second zone of the intermediate portion.

8. The method according to claim 7, further comprising the steps of:
configuring the lower portion to comprise a seal lip
for being disposed directly adjacent the propeller
shaft of the ship and configuring the seal lip for
sealing about the propeller shaft;
configuring the lip seal such that, upon an increase in
the pressure of the outside medium:
the angle between the first zone and second zones
of the intermediate portion is increased; and
pressure is relieved from the seal lip 9. The method according to claim 8, further comprising the steps of:
configuring the first zone of the intermediate portion
of the lip seal to comprise a flat planar surface
portion when the outside medium is at normal
pressure;
configuring the lip seal such that the gap, when the
outside medium is at normal pressure, is bounded
by:
the flat planar surface portion of the first zone of
the intermediate portion of the lip seal; and
the curved surface of the recessed portion of the
second annular portion.

10. The method according to claim 9, further comprising the steps of:
configuring the angled zone of the intermediate portion to comprise a first side, for facing towards the
outside medium, and a second side, for facing away
from the outside medium;
configuring the second annular portion to comprise a
second portion adjacent the angled zone of the
intermediate portion of the lip seal;
configuring the second portion of the second annular
portion to comprise a contact surface for being
oriented in a radial direction of the propeller shaft;
configuring the second side of the angled zone of the
intermediate portion of the lip seal to comprise a
flat planar portion;
configuring the flat planar portion of the second side
of the angled zone to form, when the outside medium is at normal pressure, a wedge-shaped gap in
conjunction with the contact surface of the second
portion of the second annular portion;
configuring the lip seal such that, when the pressure
of the outside medium is at a pressure higher than
the normal pressure, the flat planar portion of the
second side of the angled zone of the intermediate
portion of the lip seal is displaced towards the
contact surface of the second annular portion to
substantially close the wedge-shaped gap;
forming a wedge-shaped gap, by means of the flat
planar portion of the second side of the angled zone
of the intermediate portion of the lip seal and the
contact surface of the second portion of the second
annular portion; and
displacing the flat planar portion of the second side of
the angled zone of the intermediate portion of the
lip seal towards the contact surface of the second
annular portion to substantially close the wedgeshaped gap.

11. The method according to claim 10, wherein a
space, for being filled with fluid, is defined between the
propeller shaft, the second annular portion, and the lip
seal, on a side of the lip seal opposite from the outside
medium, the method further comprising the steps of:
configuring the first portion of the second annular
portion to comprise the recessed portion;
configuring the wedge-shaped gap to define an angle
of about 16 degrees when the outside medium is in
the rest position;
configuring the lip seal for being in a rest position
when the outside medium is at normal pressure and
for being in a deformed position when the pressure
of the outside medium is higher than normal pressure;
configuring the lip seal to follow oscillating movements of the shaft both when the first zone of the
intermediate portion is in the rest position and when the first zone of the intermediate portion is in the deformed position;

configuring the angled zone of the lip seal to be in contact with the second annular portion of the seal housing at a contact point when the lip seal is in the rest position;

disposing the recessed portion of the second annular portion between the upper portion of the lip seal and the point where the angled zone of the lip seal contacts the second annular portion;

configuring the angle between the first zone and the second zone of the intermediate portion for being an acute angle both when the lip seal is in the rest position and when the lip seal is in the deformed position;

configuring the lip seal to comprise a rubber-elastic material;

configuring each of the first and second annular portions to be a back-up ring;

configuring each of the first and second annular portions to comprise a rigid material;

configuring each of the first and second annular portions for being non-rotatably disposed about the propeller shaft;

orienting the first zone of the intermediate portion at an angle with respect to a radial direction of the propeller shaft when the lip seal is in the rest position;

configuring the angle zone to comprise a generally rounded connection between the first zone of the intermediate portion and the second zone of the intermediate portion;

configuring the seal lip for being in direct contact with the propeller shaft;

configuring the angle between the first zone and the second zone, defined by the angled zone, for being open towards the outside medium;

configuring the angle between the first zone and the second zone for being between about 50 and about 70 degrees when the lip seal is in the rest position;

configuring the lip seal to comprise an annular groove in the vicinity of the second portion of the intermediate portion;

providing coil spring means and accommodating the coil spring means within the annular groove;

configuring the coil spring means for holding the seal lip on the propeller shaft;

configuring the coil spring means to have a generally circular cross-section;

configuring each of the first and second annular portions to comprise a protrusion;

disposing the protrusion of the first annular portion opposite the protrusion of the second annular portion, and configuring both of the protrusions to define a space therebetween;

configuring the first annular portion and the second annular portion to form an annular channel being partially bounded by the protrusions;

configuring the annular channel to have a generally rectangular cross-section;

clamping the upper portion of the lip seal in place, in a fluid-tight manner, in the annular channel formed by the first and second annular portions;

configuring the first zone of the intermediate portion of the lip seal to initiate at the space between the protrusions and to substantially fill the space between the protrusions;

configuring the recessed portion of the second annular portion to initiate adjacent the projection of the second annular portion; and orienting the second portion of the second annular portion in a radial direction of the propeller shaft.

12. The method according to claim 9, wherein a space, for being filled with fluid, is defined between the propeller shaft, the second annular portion, and the lip seal, on a side of the lip seal opposite from the outside medium, the method further comprising the steps of:

configuring the second annular portion to comprise:
a first portion adjacent the first zone of the intermediate portion of the lip seal; and
a second portion adjacent the angled zone of the intermediate portion of the lip seal;

configuring the second portion of the second annular portion to comprise a contact surface for being oriented in a radial direction of the propeller shaft;

configuring the first portion of the second annular portion to comprise the recessed portion;

configuring the lip seal for being in a rest position when the outside medium is at normal pressure and for being in a deformed position when the pressure of the outside medium is higher than normal pressure;

configuring the lip seal to follow oscillating movements of the shaft both when the first zone of the intermediate portion is in the rest position and when the first zone of the intermediate portion is in the deformed position;

configuring the angled zone of the lip seal to be in contact with the second annular portion of the seal housing at a contact point when the lip seal is in the rest position;

disposing the recessed portion of the second annular portion between the upper portion of the lip seal and the point where the angled zone of the lip seal contacts the second annular portion;

configuring the angle between the first zone and the second zone of the intermediate portion for being an acute angle both when the lip seal is in the rest position and when the lip seal is in the deformed position;

configuring the lip seal to comprise a rubber-elastic material;

configuring each of the first and second annular portions to be a back-up ring;

configuring each of the first and second annular portions to comprise a rigid material;

configuring each of the first and second annular portions for being non-rotatably disposed about the propeller shaft;

orienting the first zone of the intermediate portion at an angle with respect to a radial direction of the propeller shaft when the lip seal is in the rest position;

configuring the angle zone to comprise a generally rounded connection between the first zone of the intermediate portion and the second zone of the intermediate portion;

configuring the seal lip for being in direct contact with the propeller shaft;

configuring the angle between the first zone and the second zone, defined by the angled zone, for being open towards the outside medium;

configuring the angle between the first zone and the second zone for being between about 50 and about 70 degrees when the lip seal is in the rest position;

configuring the lip seal to comprise an annular groove in the vicinity of the second portion of the intermediate portion;

providing coil spring means and accommodating the coil spring means within the annular groove;

configuring the coil spring means for holding the seal lip on the propeller shaft;

configuring the coil spring means to have a generally circular cross-section;

configuring each of the first and second annular portions to comprise a protrusion;

disposing the protrusion of the first annular portion opposite the protrusion of the second annular portion, and configuring both of the protrusions to define a space therebetween;

configuring the first annular portion and the second annular portion to form an annular channel being partially bounded by the protrusions;

configuring the annular channel to have a generally rectangular cross-section;

clamping the upper portion of the lip seal in place, in a fluid-tight manner, in the annular channel formed by the first and second annular portions;

configuring the first zone of the intermediate portion of the lip seal to initiate at the space between the protrusions and to substantially fill the space between the protrusions;

configuring the recessed portion of the second annular portion to initiate adjacent the projection of the second annular portion;

orienting the second portion of the second annular portion for in a radial direction of the propeller shaft; and configuring the lip seal such that, while the first zone of the intermediate portion displaces into the gap, the angled zone undergoes a roller-like deformation along the second portion of the second annular portion, initiating from the contact point.

13. Method of sealing about a propeller shaft of a ship with apparatus for sealing about a propeller shaft of a ship, the apparatus comprising: a seal housing; the seal housing comprising a first annular portion and a second annular portion, each of the first annular portion and the second annular portion being disposed about the propeller shaft; a lip seal being fixedly held between the first annular portion of the seal housing and the second annular portion of the seal housing; the second annular portion comprising a recessed portion disposed adjacent the lip seal; the lip seal being configured for sealing out an outside medium; the lip seal comprising an upper portion, an intermediate portion and a lower portion; the upper portion of the lip seal being fixedly held between a portion of the first annular portion of the seal housing and a portion of the second annular portion of the seal housing; the lower portion of the lip seal for being disposed directly about the propeller shaft and being configured for sealing about the propeller shaft; the intermediate portion of the lip seal extending between the upper portion of the lip seal and the lower portion of the lip seal; the intermediate portion of the lip seal being configured for, in response to a change in the pressure of the outside medium: being displaced into the recessed portion of the second annular portion; and relieving pressure from the lower portion of the lip seal; said method comprising the steps of:

providing a seal housing;

providing the seal housing with a first annular portion and a second annular portion;

disposing each of the first annular portion and the second annular portion about the propeller shaft;

providing a lip seal and fixedly holding the lip seal between the first annular portion of the seal housing and the second annular portion of the seal housing;

providing the second annular portion with a recessed portion adjacent the lip seal;

configuring the lip seal for sealing out an outside medium;

configuring the lip seal to include an upper portion, an intermediate portion and a lower portion;

fixedly holding the upper portion of the lip seal between a portion of the first annular portion of the seal housing and a portion of the second annular portion of the seal housing;

disposing the lower portion of the lip seal directly about the propeller shaft and configuring the lower portion of the lip seal for sealing about the propeller shaft;

configuring the intermediate portion to extend between the upper portion and the lower portion;

configuring the intermediate portion of the lip seal for, in response to a change in the pressure of the outside medium:

being displaced into the recessed portion of the annular portion; and relieving pressure from the lower portion of the lip seal; and performing the following steps in response to a change in the pressure of the outside medium:

displacing the intermediate portion into the recessed portion of the second annular portion; and relieving pressure from the lower portion of the lip seal;

configuring the intermediate portion of the lip seal to comprise:

a first zone disposed adjacent the upper portion;

a second zone disposed adjacent the lower portion;

the second zone being configured for supporting the lower portion;

an angled zone connecting the first zone and the second zone; and the angled zone being configured to define an acute angle between the first zone of the intermediate portion and the second zone of the intermediate portion;

configuring the second annular portion to comprise a first portion adjacent the first zone of the intermediate portion of the lip seal;

configuring the recessed portion of the second annular portion of the seal housing such that:

at a normal pressure of the outside medium, a gap exists between the first zone of the intermediate portion of the lip seal and the first portion of the second annular portion; and when the pressure of the outside medium is higher than the normal pressure, the first zone of the intermediate portion of the lip seal fills the gap;

providing the gap between the first zone of the intermediate portion of the lip seal and the first portion of the second annular portion, at a normal pressure of the outside medium;

filling the gap with the intermediate portion of the lip seal, when the pressure of the outside medium is higher than the normal pressure;

configuring the recessed portion of the second annular portion to comprise a curved surface, the curved surface being concave with respect to the lip seal;

supporting the lower portion of the lip seal by means of the second zone of the intermediate portion;

configuring the lower portion to comprise a seal lip for being disposed directly adjacent the propeller shaft of the ship and configuring the seal lip for sealing about the propeller shaft;

configuring the lip seal such that, upon an increase in the pressure of the outside medium:
the angle between the first zone and second zones of the intermediate portion is increased; and
pressure is relieved from the seal lip;

configuring the first zone of the intermediate portion of the lip seal to comprise a flat planar surface portion when the outside medium is at normal pressure;

configuring the lip seal such that the gap, when the outside medium is at normal pressure, is bounded by:
the flat planar surface portion of the first zone of the intermediate portion of the lip seal; and
the curved surface of the recessed portion of the second annular portion;

configuring the angled zone of the intermediate portion to comprise a first side, for facing towards the outside medium, and a second side, for facing away from the outside medium;

configuring the second annular portion to comprise a second portion adjacent the angled zone of the intermediate portion of the lip seal;

configuring the second portion of the second annular portion to comprise a contact surface for being oriented in a radial direction of the propeller shaft;

configuring the second side of the angled zone of the intermediate portion of the lip seal to comprise a flat planar portion;

configuring the flat planar portion of the second side of the angled zone to form, when the outside medium is at normal pressure, a wedge-shaped gap in conjunction with the contact surface of the second portion of the second annular portion;

configuring the lip seal such that, when the pressure of the outside medium is at a pressure higher than the normal pressure, the flat planar portion of the second side of the angled zone of the intermediate portion of the lip seal is displaced towards the contact surface of the second annular portion to substantially close the wedge-shaped gap;

forming a wedge-shaped gap, by means of the flat planar portion of the second side of the angled zone of the intermediate portion of the lip seal and the contact surface of the second portion of the second annular portion;

displacing the flat planar portion of the second side of the angled zone of the intermediate portion of the lip seal towards the contact surface of the second annular portion to substantially close the wedge-shaped gap;

defining a space for being filled with fluid, the space being disposed between the propeller shaft, the second annular portion, and the lip seal, on a side of the lip seal opposite from the outside medium;

configuring the first portion of the second annular portion to comprise the recessed portion;

configuring the wedge-shaped gap to define an angle of about 16 degrees when the outside medium is in the rest position;

configuring the lip seal for being in a rest position when the outside medium is at normal pressure and for being in a deformed position when the pressure of the outside medium is higher than normal pressure;

configuring the lip seal to follow oscillating movements of the shaft both when the first zone of the intermediate portion is in the rest position and when the first zone of the intermediate portion is in the deformed position;

configuring the angled zone of the lip seal to be in contact with the second annular portion of the seal housing at a contact point when the lip seal is in the rest position;

disposing the recessed portion of the second annular portion between the upper portion of the lip seal and the point where the angled zone of the lip seal contacts the second annular portion;

configuring the angle between the first zone and the second zone of the intermediate portion for being an acute angle both when the lip seal is in the rest position and when the lip seal is in the deformed position;

configuring the lip seal to comprise a rubber-elastic material;

configuring each of the first and second annular portions to be a back-up ring;

configuring each of the first and second annular portions to comprise a rigid material;

configuring each of the first and second annular portions for being non-rotatably disposed about the propeller shaft;

orienting the first zone of the intermediate portion at an angle with respect to a radial direction of the propeller shaft when the lip seal is in the rest position;

configuring the angle zone to comprise a generally rounded connection between the first zone of the intermediate portion and the second zone of the intermediate portion;

configuring the seal lip for being in direct contact with the propeller shaft;

configuring the angle between the first zone and the second zone, defined by the angled zone, for being open towards the outside medium;

configuring the angle between the first zone and the second zone for being between about 50 and about 70 degrees when the lip seal is in the rest position;

configuring the lip seal to comprise an annular groove in the vicinity of the second portion of the intermediate portion;

providing coil spring means and accommodating the coil spring means within the annular groove;

configuring the coil spring means for holding the seal lip on the propeller shaft;

configuring the coil spring means to have a generally circular cross-section;

configuring each of the first and second annular portions to comprise a protrusion;

disposing the protrusion of the first annular portion opposite the protrusion of the second annular portion, and configuring both of the protrusions to define a space therebetween;

configuring the first annular portion and the second annular portion to form an annular channel being partially bounded by the protrusions;

configuring the annular channel to have a generally rectangular cross-section;

clamping the upper portion of the lip seal in place, in a fluid-tight manner, in the annular channel formed by the first and second annular portions;

configuring the first zone of the intermediate portion of the lip seal to initiate at the space between the protrusions and to substantially fill the space between the protrusions;

configuring the recessed portion of the second annular portion to initiate adjacent the projection of the second annular portion; and orienting the second portion of the second annular portion in a radial direction of the propeller shaft.

* * * * *